United States Patent [19]
May et al.

[11] Patent Number: 5,075,083
[45] Date of Patent: Dec. 24, 1991

[54] PLANT FOR THE PRODUCTION OF ALKYLATED RESINS

[75] Inventors: Keith A. May, Stourbridge; Paul A. Freeman, Dudley, both of England

[73] Assignee: BIP Chemicals Limited, Manchester, England

[21] Appl. No.: 416,250

[22] Filed: Sep. 26, 1989

[30] Foreign Application Priority Data

Oct. 6, 1988 [GB] United Kingdom ............... 8823465

[51] Int. Cl.⁵ ............................................. B01J 19/18
[52] U.S. Cl. .................................. 422/135; 422/138
[58] Field of Search ............ 422/187, 234, 135, 138; 203/DIG. 6; 261/112.1, 117

[56] References Cited

U.S. PATENT DOCUMENTS

| | | | |
|---|---|---|---|
| 2,901,426 | 8/1959 | Waddill et al. | 208/355 |
| 3,626,672 | 12/1971 | Burbidge | 261/117 |
| 4,065,267 | 12/1977 | Ladage et al. | 422/138 |
| 4,158,092 | 6/1979 | Bötsch | 528/500 |
| 4,209,466 | 6/1980 | Wolf et al. | 422/197 |
| 4,740,272 | 4/1988 | Vera-Cataneda | 203/DIG. 19 |

Primary Examiner—Peter Kratz
Attorney, Agent, or Firm—Nixon & Vanderhye

[57] ABSTRACT

In plant for the production of alkylated resins from an alcohol of boiling point greater than 100° C. at atmospheric pressure, comprising an alkylation reactor, a distillation column, a condenser, and a separator, structure is provided to ensure that contact between descending alcohol-rich liquid phase and the vapor stream of alcohol and water ascending from the reactor is confined essentially to the walls of the column.

1 Claim, 1 Drawing Sheet

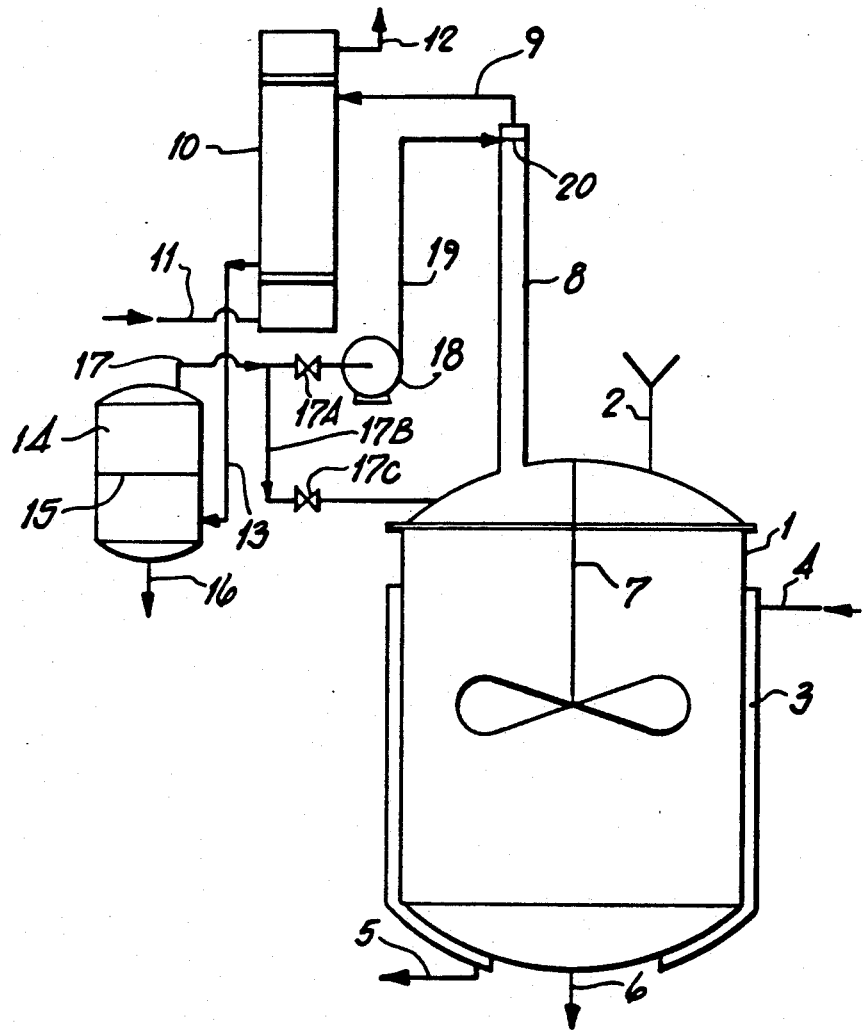

PLANT FOR THE PRODUCTION OF ALKYLATED RESINS

This invention relates to plant for the production of alkylated resins, for example alkylated urea or melamine-formaldehyde resins, from an alcohol of boiling point greater than 100° C. at atmospheric pressure.

In the production of alkylated urea- or melamine-formaldehyde resins, urea or melamine is reacted with formaldehyde (HCHO) at pH5-6 or above to form methylol (—$CH_2OH$) derivatives, and these latter are then alkylated with an alcohol (ROH, of boiling point greater than 100° C. at atmospheric pressure) under more acidic conditions to form ethers —$CH_2OR$. The alkylation reaction (better—but not usually—referred to as an etherification reaction) is accompanied by formation of water; and since water reduces the rate of reaction it is standard practice to remove it by distilling it off with the alcohol employed, for example butanol or isobutanol. The vapour thus distilled off is condensed to liquid which is separated into two phases: an alcohol-rich phase and an aqueous phase. Since each component has an appreciable solubility in the other, the phases are by no means pure. Accordingly, before returning the alcohol-rich phase to the reactor, it is desirable to treat it so as to reduce the proportion of water present dissolved in it. One method of doing this is described in U.S. Pat. No. 4,065,267, and entails passing the alcohol-rich phase downwards through the distillation column up which the vaporous mixture of alcohol and water is distilled from the reactor. Most of the water in the alcohol-rich liquid phase is thus transferred as vapour to the ascending vaporous mixture of alcohol and water, and the liquid phase that eventually reaches the reactor is thus much drier than it would otherwise have been. The method described in U.S. Pat. No. 4,065,267 is very efficient, but because it involves the use of a distillation column packed with saddles, rings, or other packing, or a column equipped with bubble plates or like means designed to increase the area of contact between ascending vapour phase and decending liquid phase, and also the use of a reboiler and associated instrumentation, the plant is expensive.

The present invention provides a considerably cheaper plant which nevertheless produces product of good quality at acceptably high throughput.

The plant of the invention for the production of alkylated resins from an alcohol of boiling point greater than 100° C. at atmospheric pressure comprises:

a) a reactor with associated means for heating and agitating said alcohol and the material to be alkylated;

b) a distillation column connected at its lower part to said reactor;

c) a condenser connected to the upper part of said column and having associated cooling means;

d) a separator which is connected to said condenser and in which liquid condensate from the condenser can be separated into an alcohol-rich phase and an aqueous phase, said separator being additionally connected to the upper part of column (b); and e) means for distributing alcohol-rich liquid phase, delivered from the separator to the upper part of column (b), around the walls of said column so as to flow downwardly thereon, so that contact between the descending alcohol-rich liquid phase and the vapour stream of alcohol and water ascending from the reactor is confined essentially to the walls of said column.

Preferably said means for distributing alcohol-rich liquid phase around the walls of the distillation column takes the form of a toroidal tube supported in the upper part of the column and having apertures for said distribution spaced around its outer periphery.

The invention is further illustrated with reference to the Example which follows later and to the accompanying drawings, in which:

FIG. 1 is a diagrammatic representation of plant; and
FIG. 2 is a plan view, partly in section, of part of the plant.

The plant comprises a reaction vessel 1 to which reactants can be charged via means 2 and which is surrounded by a heating jacket, 3 to which a heating medium such as steam can be admitted via inlet 4 and from which the medium can be drained via outlet 5. The reactor 1 has an outlet 6 for the product of reaction (alkylated resin) and a stirrer 7 for agitating the reactants. (The various valves for fluid flow regulation are, for simplicity, not shown.) The lid of the reactor is connected to the lower end of a distillation column 8, which is empty i.e. unobstructed, being entirely free from packing medium such as Raschig rings, and without bubble plates or the like designed to promote contact between ascending vapour and descending liquid condensate. Such contact as there is between vapour and condensate is brought about by means 20 (at the upper end of the column) which will be described later.

Above means 20 is a line 9 which conducts vapour leaving the distillation column to a condenser 10, through which coolant is circulated via inlet 11 and outlet 12. Condensate formed in the condenser passes via line 13 to a separator 14 containing a conventional fibre packing. In separator 14 the condensate separates into two phases, an upper consisting of a solution (usually saturated) of water in the alcohol reactant, and a lower consisting of a solution (again, usually saturated) of the alcohol in water. The latter phase is the denser of the two, and forms a lower layer which can be drained from the separator via outlet 16. The phase interface is represented by 15.

The upper, alcohol-rich, phase leaves the separator via line 17 and valve 17A and is pumped by pump 18 through line 19 to means 20 referred to earlier. This (see FIG. 2) comprises a toroidal tube or ring 20 which has, spaced at regular intervals around its outer periphery, holes 21 through which the aforesaid alcohol-rich phase can be sprayed against the interior wall of distillation column 8 so as to flow downwardly thereon as a thin film under gravity. The ring 20 is supported in column 8 by elements 22.

Suitable dimensions for spray distributor ring 20 in a distillation column 3 m high and of diameter 30.5 cm connected to a reactor of capacity 9100 liters are: toroidal cross-section, 2.54 cm; hole diameter, 0.32 cm; distance between adjacent holes, 2.54 cm; clearance between ring and column interior wall, 1.27 cm.

A line 17B under the control of valve 17C is provided to return the alcohol-rich phase direct to the reactor 1 when desired; for example, during methylolation but before alkylation.

EXAMPLE 5.2 moles of formaldehyde (as 44% aqueous solution) and 4.05 moles n-butanol were charged to the reactor 1, and the pH of the mixture was adjusted to be within the range 5.8–6.3 using sodium hydroxide or formic acid. 1 mole of melamine was added, and the mixture was heated to reflux. Vapours leaving the distillation column condensed in the condenser, and the condensate was then directed to the separator, where it separated into two phases: an upper layer of wet butanol (butanol with about 15-20% dissolved water) and a lower aqueous layer containing about 8% dissolved butanol. The wet butanol layer was returned to the reactor, while the lower aqueous layer was continously removed. Three hours after the start of distillation the heating was reduced, and vapour was condensed entirely in the distillation column and thus returned to the reactor 1. A further 0.93 moles of butanol were added. The heat was then increased and distillate was again directed to the separator to continue water removal.

At a resin temperature of 102° C., a small addition of lactic acid was made to promote etherification. At this point, valve 17A was opened and a proportion of the wet butanol leaving separator 14 was pumped by pump 18 to the top of the column 8, where it was sprayed against the inside surface of the column by the spray distributor ring 20. (The proportion directed to the column top depends on the diameter of the ring 20 (here, 2.54 cm) and the extent to which valve 17A is opened.)

Heating and distillation were continued until the reactor contents had an ASTM Solvent Tolerance of about 38 and a PRS Viscosity of about 7. At this point the reaction was considered to be complete, and the wet butanol flow to the top of the column was stopped. The reactor contents were then cooled to 60° C. and the viscosity was adjusted to about 13 PRS by vacuum distillation of butanol from the reactor. The reactor time for the process described (i.e. the time from adding the lactic acid to the time when the solvent tolerance end point is attained) was 9 hours.

We claim:

1. Plant for the production of alkylated resins from an alcohol of boiling point greater than 100° C. at atmospheric pressure, comprising:
   a) a reactor with associated means for heating and agitating said alcohol and the material to be alkylated;
   b) an empty unobstructed distillation column connected at its lower part to said reactor;
   c) a condenser connected to the upper part of said column and having associated cooling means;
   d) a separator which is connected to said condenser and in which liquid condensate from the condenser can be separated into an alcohol-rich phase and an aqueous phase, said separator being additionally connected to the upper part of column (b); and
   e) spray means for distributing alcohol-rich liquid phase, delivered from the separator to the upper part of column (b), around the walls of said column so as to flow downwardly thereon, so that contact between the descending alcohol-rich liquid phase and the vapour stream of alcohol and water ascending from the reactor is confined essentially to the walls of said column, said spray means comprising a toroidal tube supported in the upper part of the column and having apertures for said distribution spaced around its outer periphery.

* * * * *